United States Patent
Yoaz et al.

(10) Patent No.: US 6,694,421 B2
(45) Date of Patent: Feb. 17, 2004

(54) CACHE MEMORY BANK ACCESS PREDICTION

(75) Inventors: Adi Yoaz, Talmy-Menache (IL); Ronny Ronen, Haifa (IL); Lihu Rappoport, Haifa (IL); Mattan Erez, Haifa (IL); Stephan J. Jourdan, Haifa (IL); Bob Valentine, Kiriat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,381

(22) Filed: Dec. 29, 1999

(65) Prior Publication Data

US 2003/0051099 A1 Mar. 13, 2003

(51) Int. Cl.[7] ............................ G06F 12/08; G06F 9/26
(52) U.S. Cl. .......................... 711/204; 711/213; 711/5; 711/120; 711/129; 711/168
(58) Field of Search ............................ 711/5, 125, 119, 711/120, 129, 131, 148, 149, 150, 151, 153, 173, 168, 204, 213; 712/239, 237, 240

(56) References Cited

U.S. PATENT DOCUMENTS

| | | | | |
|---|---|---|---|---|
| 5,752,259 A | * | 5/1998 | Tran | 711/125 |
| 5,933,860 A | * | 8/1999 | Emer et al. | 711/125 |
| 5,953,747 A | * | 9/1999 | Steely et al. | 711/136 |
| 6,005,592 A | * | 12/1999 | Koizumi et al. | 345/531 |
| 6,173,333 B1 | * | 1/2001 | Jolitz et al. | 709/238 |
| 6,189,083 B1 | * | 2/2001 | Snyder, II | 711/213 |

* cited by examiner

Primary Examiner—B. James Peikari
(74) Attorney, Agent, or Firm—Kenyon & Kenyon

(57) ABSTRACT

A cache bank prediction unit is provided for use in a processor having a plurality of cache memory banks. The cache bank prediction unit has an input port that receives an instruction. The cache bank prediction unit also has an evaluation unit, coupled to the input port, that predicts which of the plurality of cache banks is associated with the instruction.

5 Claims, 4 Drawing Sheets

CACHE MEMORY BANK ACCESS PREDICTION

FIELD

The present invention relates to processors. More particularly, the present invention relates to memory cache bank prediction in a processor.

BACKGROUND

To more efficiently access data, many processors move information from a main memory, which can be slow to access, to a memory "cache" which allows for faster access. In addition, modern processors schedule instructions "out of order" and execute multiple instructions per cycle to achieve high performance. Some instructions, however, need to access information stored in the memory cache. For example, about one-third of all micro-instructions executed may be load/store instructions which access the memory cache. In order to achieve high performance by executing multiple instructions in a single cycle, the system should therefore permit more than one concurrent memory cache access in a cycle.

There are several ways to accomplish this goal. A truly "multi-ported" cache, i.e. one that supports multiple simultaneous accesses, fulfills this goal, but this is a complex solution that can be costly to implement in terms of area, power and speed.

Another known solution is a "multi-banked" cache. In this scheme, the memory cache is split into several independently addressed banks, and each bank supports one access per cycle. FIG. 1 illustrates a system having such a multi-bank memory cache. The system includes a first memory cache bank 240 and a second memory cache bank 340. A scheduling unit 100 schedules instructions to one of two pipelines. For example, the scheduling unit 100 may schedule an instruction to a first pipeline such that the instruction is processed by an Address Generation Unit (AGU) 210 and ultimately by a cache access unit 230. The scheduling unit 100 may instead schedule an instruction to a second pipeline such that the instruction is processed by another AGU 310 and ultimately by another cache access unit 330.

This is a sub-ideal implementation because only accesses to different banks are possible concurrently. This is done in order to reduce the complexity and cost of the cache, while still allowing more than one memory access in a single cycle. As a result, an instruction being processed by the first pipeline that needs to access information in the second memory cache bank 340 may not be able to execute.

To solve that problem, each instruction pipeline may use a "cross-bar" to access information in the other memory cache bank. For example, a set up latency 220, 320 may be incurred while the pipeline accesses information in the other memory cache bank. This delay, however, slows the operation of the pipeline.

If the memory cache bank associated with each load instruction was known, the processor could schedule load instructions in such a way so as to maximize the utilization of the banks 240, 340 and approximate true multi-porting. However, in current processors this is not done because the scheduling precedes the bank determination.

SUMMARY

In accordance with an embodiment of the present invention, a memory cache bank prediction unit is provided for use in a processor having a plurality of memory cache banks. The memory cache bank prediction unit has an input port that receives an instruction. The memory cache bank prediction unit also has an evaluation unit, coupled to the input port, that predicts which of the plurality of memory cache banks is associated with the instruction.

DETAILED DESCRIPTION

Figure 1:
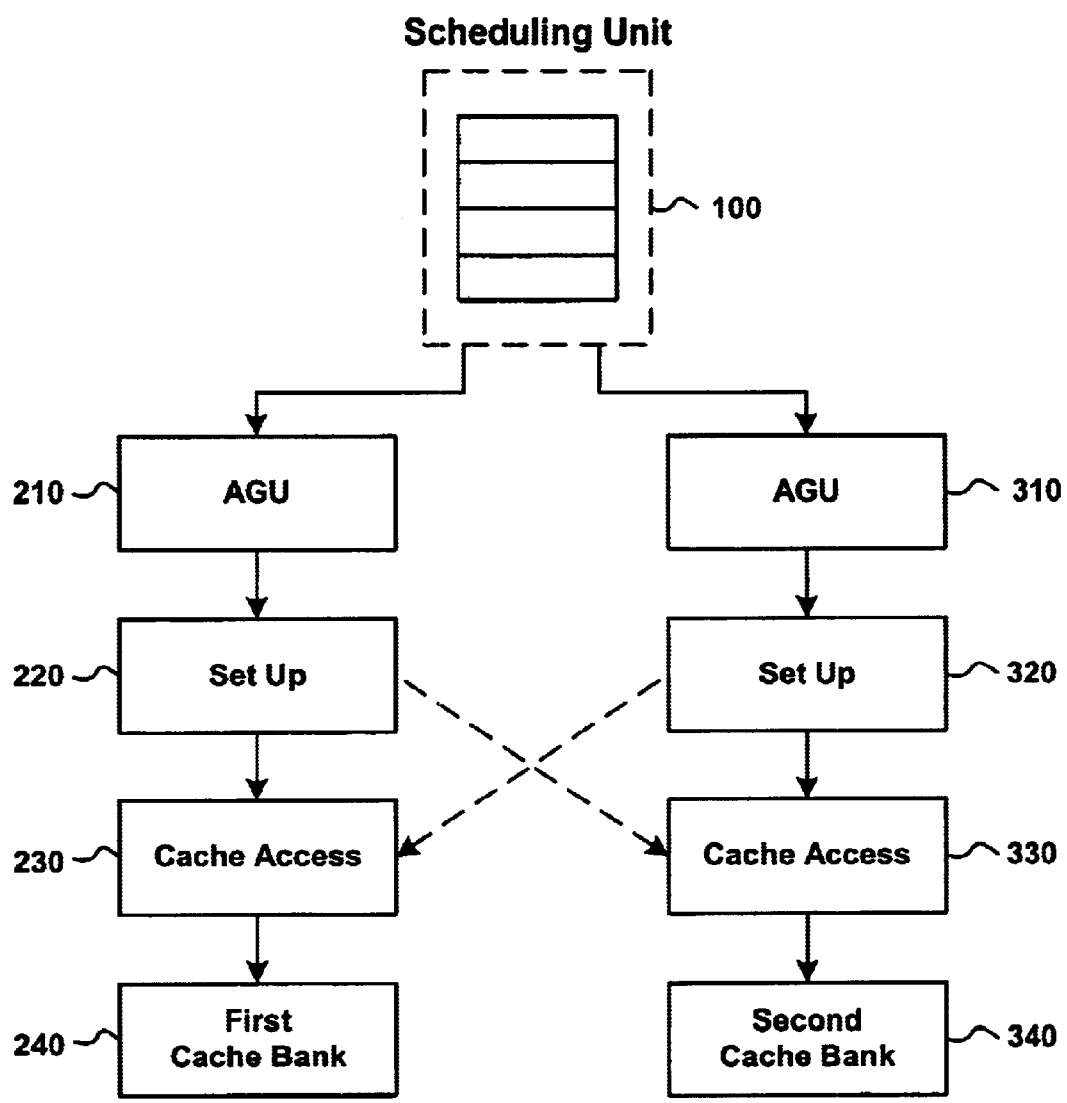
FIG. 1 illustrates a known system having a multi-bank memory cache.

An embodiment of the present invention is directed to memory cache bank prediction. Referring now in detail to the drawings wherein like parts are designated by like reference numerals throughout, FIG. 2 is a system having a multi-bank memory cache 242, 342 and a memory cache prediction unit 10 according to an embodiment of the present invention.

According to an embodiment of the present invention, the memory cache bank that a certain load/store instruction will access is predicted, allowing instructions to be scheduled according to their associated banks. This prediction may give the scheduling unit 102 an opportunity to increase the memory throughput by only scheduling loads that are free of structural, i.e. memory bank, hazards. Moreover, as explained with respect to FIG. 3, this may allow for even further simplification of the memory disambiguation and memory execution pipelines according to other embodiments of the present invention. Therefore, the memory pipeline (including address computation, cache access, memory ordering and disambiguation) may be simplified through slicing based on banks.

Figure 2:
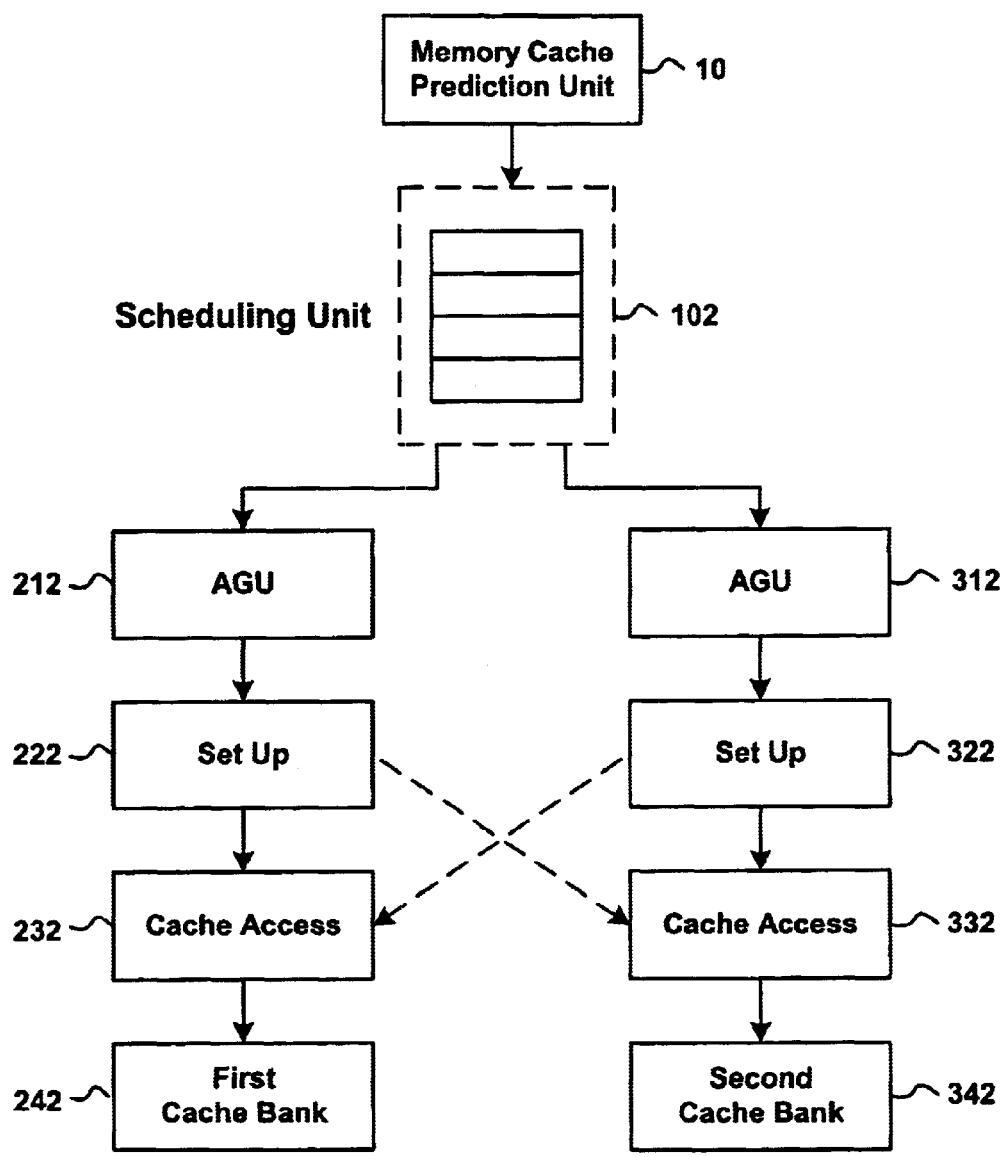
FIG. 2 is a system having a multi-bank memory cache and a memory cache prediction unit according to an embodiment of the present invention.

As shown in FIG. 2, the memory cache bank prediction unit 10 operates prior to scheduling, such as during the decode/fetch stage of a pipeline. The memory cache bank prediction unit 10 speculates on which cache bank a load instruction will access. As will be explained, this prediction may be used in several ways to increase the bandwidth of the processor.

As before, the system includes a first memory cache bank 242 and a second memory cache bank 342. A scheduling unit 102 schedules instructions to one of two pipelines, as follows. The scheduling unit 102 may schedule an instruction to a first pipeline such that the instruction is processed by an Address Generation Unit (AGU) 212 and ultimately by a cache access unit 232. The scheduling unit 102 may also schedule an instruction to a second pipeline such that the instruction is processed by another AGU 312 and ultimately by another cache access unit 332. A set up delay 222, 322 may let an instruction in one pipeline access information in the other memory cache bank.

The memory cache bank prediction unit 10 may include, for example, an input port (not shown in FIG. 2) configured to receive an instruction and an evaluation unit configured to predict which of the memory cache banks 242, 342 is associated with the instruction.

Because the memory cache bank prediction unit 10 operates prior to scheduling, the instruction stream can be properly ordered, avoiding loss of bandwidth. This is because each memory cache bank 242, 342 can only service one access simultaneously. With bank prediction, the bank information is available early in the pipeline—before instruction scheduling. Therefore, scheduling can be performed in a way that efficiently utilizes the multiple bank structure, i.e. memory operations predicted to access the same bank are not scheduled simultaneously. This enhanced scheduling scheme may be used alone, or in conjunction with the pipeline simplifications described with respect to FIG. 3.

Many different algorithms could be used to predict which memory cache bank 242, 342 is associated with an instruction, and the algorithms may be similar to those used in the field of binary predictors, such as branch prediction. For example, several well known predictors are widely used in the area of branch prediction, including Yeh and Patt, "Two-Level Adaptive Training Branch Prediction, MICRO'24 (December 1991); S. Mcfarling, "Combining Branch Predictors," WRL Tech. Note TN-36 (June 1993); and P. Michaud, A. Seznec and R. Uhlig, "Trading Conflict and Capacity Aliasing in Conditional Branch Predictors," ISCA'24 (June 1998).

Bank predictions can be based on, for example, bank history information, control flow information, and/or load target-address information. In accordance with an embodiment of the present invention, increased prediction accuracy results from using a combination of binary predictions. In such a case, each binary prediction predicts a bank and has an associated confidence level. A number of ways of using these multiple predictions is possible as follows:

1. The bank prediction may be, based on a simple majority vote of the different binary predictions; or
2. A weight may be assigned to each of the different predictions and the weights summed.

Only total if a predetermined threshold is obtained is the prediction considered valid. When using these methods, and others, furthermore the following can be done:

3. Only those predictions with a high confidence level are taken into account; and/or
4. Different weights are assigned to the different predictions based on level of confidence.

Note that the particular algorithms chosen for bank prediction may involve tradeoffs and may be dependent upon the specific Central Processing Unit (CPU) implementation. One parameter affecting the memory cache bank prediction unit 10 is the CPU's penalty for misprediction, i.e. a misprediction can lead to a pipeline flush in some micro-architectures. If the penalty is large, the prediction may need to be highly accurate for the CPU to benefit. A lower penalty, in contrast, may allow for an increased number of predictions and, thus, mispredictions. Moreover, there may be a tradeoff between the accuracy and complexity of the memory cache bank prediction unit 10.

Figure 3:
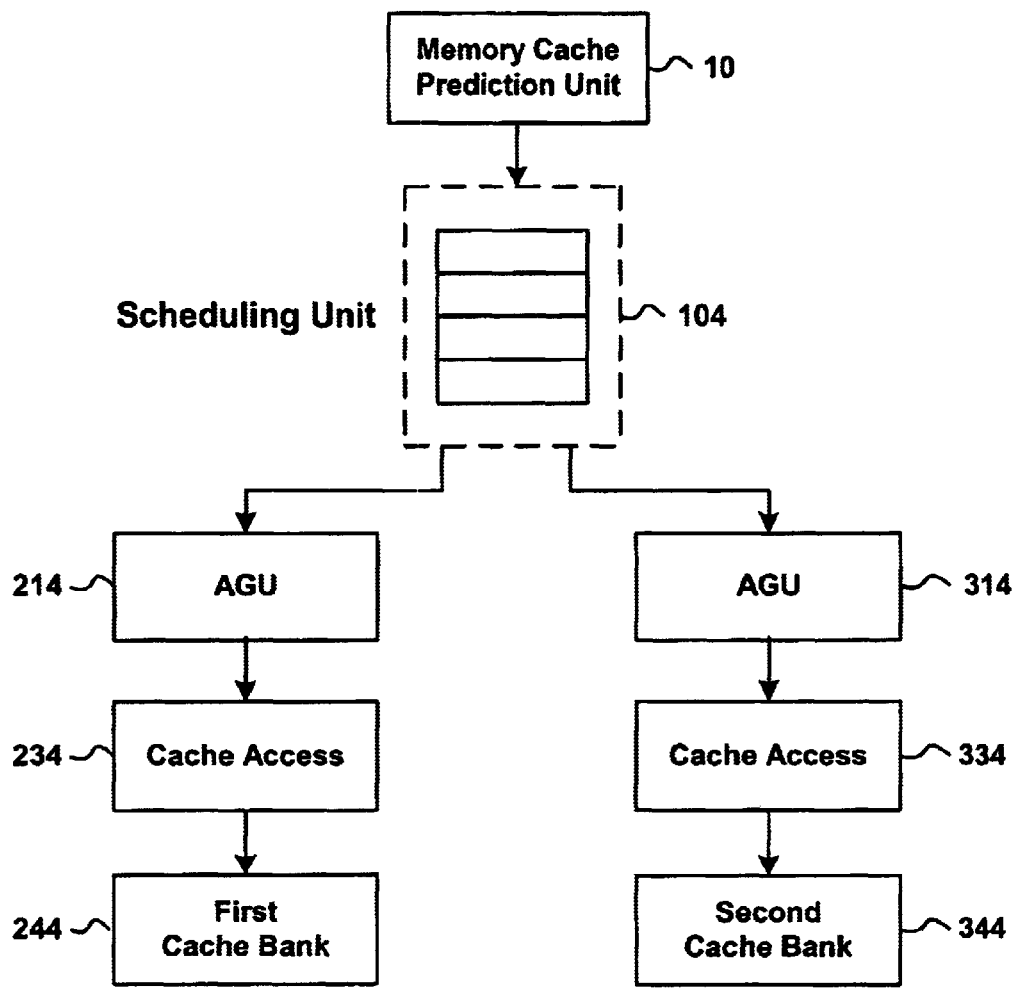
FIG. 3 is a simplified multi-pipeline system according to an embodiment of the present invention.

FIG. 3 is a simplified multi-pipeline system according to an embodiment of the present invention. As before, the memory cache bank prediction unit 10 is coupled to a scheduling unit 104. A first instruction pipeline runs from the scheduling unit 104 to a first memory cache bank 244. A second instruction pipeline runs from the scheduling unit 104 to a second memory cache bank 344. According to this embodiment of the present invention, the scheduling unit 104 may place an instruction in both pipelines. Note that instructions in the first pipeline are unable to access information in the second memory cache bank 344, and instruction in the second pipeline are unable to access information the first memory cache bank 244. As a result, an instruction in the first instruction pipeline is discarded and reexecuted if it needs to access information in the second memory cache bank 344. In other words, a bank conflict causes a re-execution of the load instruction, and perhaps dependent instructions (depending on the CPU micro-architecture).

By providing prediction in an early stage of the pipeline, the load instruction can be scheduled to a simplified memory execution pipeline. The simplified memory pipeline does not feature any cross-bar linking it to all cache banks, and is hard-wired to only one bank (i.e., is a single-bank pipeline). Inter-connections can be costly, and their complexity increases super-linearly with the number of ports. The single bank pipeline, on the other hand, is highly scalable. Similarly, disambiguation is usually performed with structures featuring some Context Associated Memory (CAM) lookup capabilities where the number of entries determines the access time. Slicing the disambiguation hardware into several banks makes the implementation more simple and fast.

The simplified pipeline is also one stage shorter than the regular multi-banked pipeline. Indeed, the decision, or set up, stage where the proper bank is picked (i.e., elements 222 and 322 in FIG. 2), is no longer required. This reduces the latency for load operations with only a relatively small effect on the overall performance—provided the bank is predicted with sufficient accuracy. In other words, advantages of a multi-banked pipeline are maintained without incurring any major disadvantages, but without a cross link.

In the simplified pipeline, however, a mispredicted load can not be executed, and must be instead flushed and re-executed. In order to minimize this degradation in performance, when there is no contention on the memory ports (or if the confidence level of a bank prediction is low) the memory operation may be placed in, or "dispatched to," all pipelines. That is to say, it is preferable not to speculate in order to avoid this duplication. Once the actual bank is known, the instructions in the wrong pipelines are canceled, wasting once cycle in each pipe in the case of duplication due to a low confidence bank prediction. By using duplication where confidence is low, the penalty associated with reexecution is avoided. Table I illustrates the tradeoff between simplifying the pipeline and traditional multi-banking in the case of mispredictions.

TABLE I

Simplified and Traditional Multi-Bank Pipelines

| Pipe 0 | Pipe 1 | Traditional | Simplified |
|---|---|---|---|
| load from bank 0 | load from bank 0 | re-execute 1 | re-execute 1 |
| load from bank 1 | load from bank 1 | re-execute 0 | re-execute 0 |
| load from bank 0 | load from bank 1 | OK | OK |
| load from bank 1 | load from bank 0 | OK | re-execute 0 and 1 |
| load from bank 0 | | OK | OK |
| load from bank 1 | | OK | re-execute or OK* |
| | load from bank 1 | OK | OK |
| | load from bank 0 | OK | re-execute or OK* |

Note that in some cases (marked with an * in Table I), the simplified pipeline may result in either (I) a re-execution or (ii) the load was replicated to both pipelines, in which case only the correct pipeline will complete execution of the instruction (i.e., OK).

Figure 4:
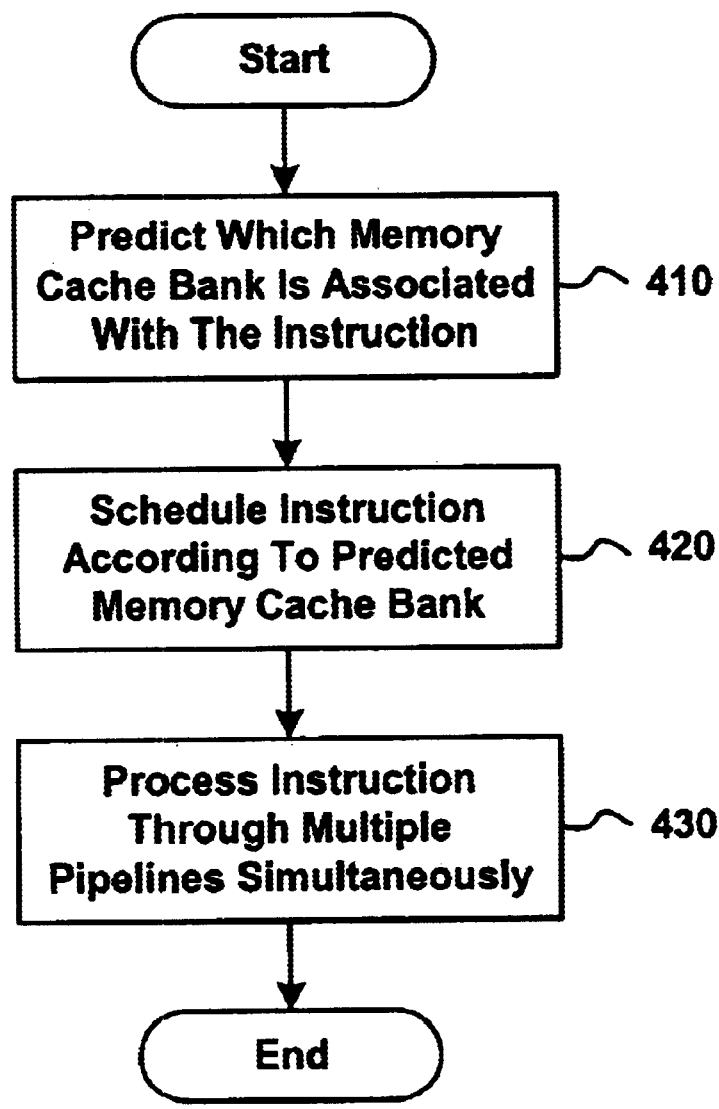
FIG. 4 is a method of scheduling instructions according to an embodiment of the present invention.

FIG. 4 is a method of scheduling instructions according to an embodiment of the present invention. At 410, it is predicted which of a plurality of memory cache banks is associated with an instruction. The instruction is scheduled for execution at 420 based on the predicted memory cache bank. At 430 the instruction is processed through multiple pipelines simultaneously, and only the pipeline associated with the correct memory cache bank is completed.

Although various embodiments are specifically illustrated and described herein, it will be appreciated that modifications and variations of the present invention are covered by the above teachings and within the purview of the appended claims without departing from the spirit and intended scope of the invention. For example, although binary prediction algorithms were used to illustrate embodiments of the present invention, it will be appreciated that other implementations will also fall within the scope of the invention. An example of such a predictor is an address predictor. Moreover, the present invention applies to a broad range of pipeline architectures, and is therefore a general approach that includes a broad range of specific implementations. In addition, although software or hardware are described to control certain functions, such functions can be performed using either software, hardware or a combination of software and hardware, as is well known in the art. As is also known, software may be stored, such as in memory, in the form of instructions, including micro-code instructions, adapted to be executed by a processor. As used herein, the phrase "adapted to be executed by a processor" encompasses instructions that need to be translated before being executed by the processor.

What is claimed is:

1. A memory cache bank prediction unit for use in a processor having a plurality of memory cache banks, comprising:

an input port to receive an instruction; and an evaluation unit that (1) is coupled to said input port;

(2) is to predict which of the plurality of memory cache banks is associated with the instruction; and (3) is to provide a memory cache bank prediction result to a scheduler; wherein the scheduler is to assign the instruction to one of the plurality of cache memory banks in response to said production result.

2. The memory cache bank prediction unit of claim 1, wherein said evaluation unit predicts which of the plurality of memory cache banks is associated with the instruction based on information related to at least one of: (i) a bank history; (ii) a control flow information; and (iii) a load target-address information.

3. The memory cache bank prediction unit of claim 1, wherein said evaluation unit performs a plurality of binary evaluations and predicts which of the plurality of memory cache banks is associated with the instruction based on a majority vote of the plurality of binary evaluations.

4. The memory cache bank prediction unit of claim 1, wherein said evaluation unit performs a plurality of evaluations, each evaluation being associated with a confidence, and predicts which of the plurality of memory cache banks is associated with the instruction based on the plurality of evaluation confidences.

5. The memory cache bank prediction unit of claim 4, wherein said evaluation unit predicts which of the plurality of memory cache banks is associated with the instruction based on obtaining a sum of evaluation confidences above a threshold value.

* * * * *